United States Patent
Gukeisen et al.

(10) Patent No.: US 10,145,335 B2
(45) Date of Patent: Dec. 4, 2018

(54) TURBOMACHINE THRUST REVERSER

(71) Applicant: United Technologies Corporation, Hartford, CT (US)

(72) Inventors: Robert L. Gukeisen, Middletown, CT (US); Claude Mercier, South Windsor, CT (US); Robert E. Malecki, Storrs, CT (US)

(73) Assignee: United Technologies Corporation, Farmington, CT (US)

( * ) Notice: Subject to any disclaimer, the term of this patent is extended or adjusted under 35 U.S.C. 154(b) by 701 days.

(21) Appl. No.: 13/712,240

(22) Filed: Dec. 12, 2012

(65) Prior Publication Data
US 2014/0246514 A1     Sep. 4, 2014

Related U.S. Application Data

(60) Provisional application No. 61/706,820, filed on Sep. 28, 2012.

(51) Int. Cl.
*F02K 1/72* (2006.01)
*F02K 1/58* (2006.01)
(Continued)

(52) U.S. Cl.
CPC ............. *F02K 1/58* (2013.01); *B64D 29/06* (2013.01); *F02C 7/20* (2013.01); *F02K 1/64* (2013.01); *F02K 1/72* (2013.01); *F05D 2250/34* (2013.01)

(58) Field of Classification Search
CPC ..... F02K 1/70; F02K 1/72; F02K 1/54; F02K 1/56; F02K 1/566; F02K 1/68; F02K 1/74
(Continued)

(56) References Cited

U.S. PATENT DOCUMENTS 3,598,318 A * 8/1971 Schiel ...................... 239/265.13
3,605,411 A * 9/1971 Maison ...................... 60/226.2
(Continued)

FOREIGN PATENT DOCUMENTS

EP         233282         6/2011

OTHER PUBLICATIONS

International Search Report and Written Opinion completed on Dec. 6, 2013 for International Application No. PCT/US2013/059878.
(Continued)

*Primary Examiner* — Todd E Manahan
*Assistant Examiner* — Rene Ford
(74) *Attorney, Agent, or Firm* — Carlson, Gaskey & Olds, P.C.

(57) ABSTRACT

An example thrust reverser of a gas turbine engine is configured to connect to an aircraft wing via a pylon via one or more thrust reverser mounts located adjacent to a top circumferential apex of the engine according to an exemplary aspect of the present disclosure includes, among other things, a first cowl moveable between a stowed position and a deployed position relative to a second cowl. The first cowl in the deployed position configured to permit thrust to be redirected from an engine to slow the engine. The first cowl forming a portion of a substantially annular encasement of the engine. The first cowl directly interfaces with second cowl of the encasement at a cowl interface position that is more than 18 degrees circumferentially offset from the top circumferential apex when the first cowl is in the stowed position.

17 Claims, 4 Drawing Sheets

(51) Int. Cl.
*F02K 1/64* (2006.01)
*F02C 7/20* (2006.01)
*B64D 29/06* (2006.01)

(58) Field of Classification Search
USPC ..... 60/226.2, 226.1, 262, 226.3; 239/265.23, 239/265.31; 244/110 B
See application file for complete search history.

(56) References Cited

U.S. PATENT DOCUMENTS

| | | | | |
|---|---|---|---|---|
| 3,717,304 | A * | 2/1973 | Sutton | 239/265.19 |
| 3,820,719 | A * | 6/1974 | Clark | 239/265.31 |
| 4,047,381 | A * | 9/1977 | Smith | 60/226.2 |
| 4,073,440 | A * | 2/1978 | Hapke | 239/265.29 |
| 4,147,028 | A | 4/1979 | Rodgers | |
| 4,391,409 | A | 7/1983 | Scholz | |
| 4,801,112 | A * | 1/1989 | Fournier et al. | 244/110 B |
| 4,922,713 | A * | 5/1990 | Barbarin et al. | 60/226.2 |
| 5,120,004 | A | 6/1992 | Matthias | |
| 5,197,693 | A * | 3/1993 | Remlaoui | 244/110 B |
| 5,228,641 | A * | 7/1993 | Remlaoui | 244/110 B |
| 5,713,537 | A * | 2/1998 | Tindell | 244/110 B |
| 5,778,659 | A * | 7/1998 | Duesler et al. | 60/226.1 |
| 5,799,903 | A * | 9/1998 | Vauchel | 244/110 B |
| 5,806,302 | A * | 9/1998 | Cariola et al. | 60/204 |
| 5,853,148 | A * | 12/1998 | Standish et al. | 244/110 B |
| 5,863,014 | A | 1/1999 | Standish | |
| 5,904,320 | A * | 5/1999 | Tindell | 244/110 B |
| 5,930,991 | A * | 8/1999 | Fournier et al. | 60/226.2 |
| 5,943,856 | A | 8/1999 | Lillibridge et al. | |
| 5,996,937 | A * | 12/1999 | Gonidec et al. | 244/110 B |
| 6,044,641 | A * | 4/2000 | Baudu et al. | 60/226.2 |
| 6,151,883 | A * | 11/2000 | Hatrick et al. | 60/226.2 |
| 6,170,253 | B1 * | 1/2001 | Newton | 60/226.2 |
| 6,179,249 | B1 * | 1/2001 | Canadas | 244/53 R |
| 6,434,927 | B1 * | 8/2002 | Stretton | 60/226.2 |
| 6,598,386 | B2 | 7/2003 | Johnson et al. | |
| 6,625,972 | B1 * | 9/2003 | Sternberger | 60/226.2 |
| 7,484,356 | B1 * | 2/2009 | Lair | 60/226.2 |
| 7,891,167 | B2 * | 2/2011 | Udall | 60/226.2 |
| 8,104,261 | B2 * | 1/2012 | Marshall et al. | 60/226.2 |
| 8,201,390 | B2 * | 6/2012 | Sternberger | 60/226.2 |
| 8,220,738 | B2 | 7/2012 | Calder et al. | |
| 8,226,027 | B2 * | 7/2012 | Journade et al. | 244/54 |
| 8,402,765 | B2 * | 3/2013 | Amkraut et al. | 60/771 |
| 8,505,307 | B2 * | 8/2013 | Wang | 60/771 |
| 8,677,732 | B2 * | 3/2014 | Vauchel et al. | 60/226.2 |
| 8,727,275 | B2 * | 5/2014 | Aten et al. | 244/110 B |
| 8,739,515 | B2 * | 6/2014 | Schwark et al. | 60/226.3 |
| 2009/0301056 | A1 | 12/2009 | Hatrick | |
| 2010/0115958 | A1 | 5/2010 | Parham | |
| 2010/0126139 | A1 | 5/2010 | Howe | |
| 2010/0212286 | A1 | 8/2010 | West et al. | |
| 2011/0167790 | A1 * | 7/2011 | Cloft et al. | 60/226.2 |
| 2012/0023901 | A1 | 2/2012 | Gilson et al. | |
| 2013/0193224 | A1 * | 8/2013 | Aten et al. | F02K 1/72 |

OTHER PUBLICATIONS

International Preliminary Report on Patentability for International Application No. PCT/US2013/0059878 dated Apr. 9, 2015.
Extended European Search Report for Application No. 13841868.6 dated Oct. 13, 2015.

* cited by examiner

TURBOMACHINE THRUST REVERSER

CROSS-REFERENCE TO RELATED APPLICATIONS

This application claims priority to U.S. Provisional Application No. 61/706,820, which was filed on 28 Sep. 2012 and is incorporated herein by reference.

BACKGROUND

Turbomachines, such as gas turbine engines, typically include a fan section, a compression section, a combustion section, and a turbine section. Turbomachines may employ a geared architecture connecting portions of the compression section to the fan section.

Turbomachines used to propel aircraft typically include thrust reversers. Moving components of the thrust reverser from a stowed position to a deployed position redirects thrust through the turbomachine to reduce the speed of the aircraft. In some examples, the moving components include a thrust reverser cowl that is translated axially between the stowed and deployed position.

SUMMARY

A thrust reverser of a gas turbine engine configured to connect to an aircraft wing via a pylon via one or more thrust reverser mounts located substantially at or adjacent to a top circumferential apex of the engine according to an exemplary aspect of the present disclosure includes, among other things, a first cowl moveable between a stowed position and a deployed position relative to a second cowl. The first cowl in the deployed position configured to permit thrust to be redirected from an engine to slow the engine. The first cowl forming a portion of a substantially annular encasement of the engine. The first cowl directly interfaces with second cowl of the encasement at a cowl interface position that is more than 18 degrees circumferentially offset from the top circumferential apex when the first cowl is in the stowed position.

In a non-limiting embodiment of the foregoing thrust reverser, the second cowl may extend substantially from the top circumferential apex.

In a further non-limiting embodiment of either of the foregoing thrust reversers, the thrust reverser mounts may receive a pylon at the top circumferential apex of the encasement.

In a further non-limiting embodiment of any of the foregoing thrust reversers, the second cowl extends in a first circumferential direction from the top circumferential apex to the cowl interface position, and the first cowl extends in the first circumferential direction from the cowl interface position to a bottom circumferential apex, which circumferentially opposes the top circumferential apex.

In a further non-limiting embodiment of any of the foregoing thrust reversers, the first cowl may translate axially between the stowed position and the deployed position.

In a further non-limiting embodiment of any of the foregoing thrust reversers, a fourth cowl of the encasement may move between a stowed position and a deployed position relative to a third cowl of the encasement, the third cowl directly interfacing with the fourth cowl at another position that is more than 18 degrees circumferentially offset from the top circumferential.

In a further non-limiting embodiment of any of the foregoing thrust reversers, the first cowl and the second cowl of the encasement may be positioned on an inboard side of the engine, and the third cowl and the fourth cowl may be positioned on an outboard side of the engine.

In a further non-limiting embodiment of any of the foregoing thrust reversers, the second cowl and fourth cowl may extend from circumferentially opposite sides of the top circumferential apex.

In a further non-limiting embodiment of any of the foregoing thrust reversers, the cowl interface may be circumferentially offset from the top circumferential apex from 20 to 25 degrees.

In a further non-limiting embodiment of any of the foregoing thrust reversers, the cowl interface may be circumferentially offset 32 degrees from the top circumferential apex.

In a further non-limiting embodiment of any of the foregoing thrust reversers, the first cowl may move between the deployed position and the stowed position along a path that causes the first cowl to avoid contact with a slat of the aircraft wing.

An engine configured to connect to an aircraft wing via a pylon located substantially at or adjacent to a top circumferential apex for the engine according to an exemplary aspect of the present disclosure includes, among other things, a first cowl and a second cowl. The second cowl extends from a thrust reverser mount located adjacent the top circumferential apex. The first cowl being translatable relative to the second cowl to selectively redirect thrust from the engine to slow the engine. The second cowl interfaces with the first cowl at a circumferential location that is more than 18 degrees circumferentially offset from the top circumferential apex.

In a non-limiting embodiment of the foregoing engine, the twelve o'clock position may be top circumferential apex of the engine.

In a further non-limiting embodiment of any of the foregoing engines, the thrust reverser mount may be configured to receive the pylon such that the pylon extends adjacent to the top circumferential apex.

In a further non-limiting embodiment of any of the foregoing engines, the first and the second cowls may be arcuate cowls.

In a further non-limiting embodiment of any of the foregoing engines, the interface is an axially extending interface.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
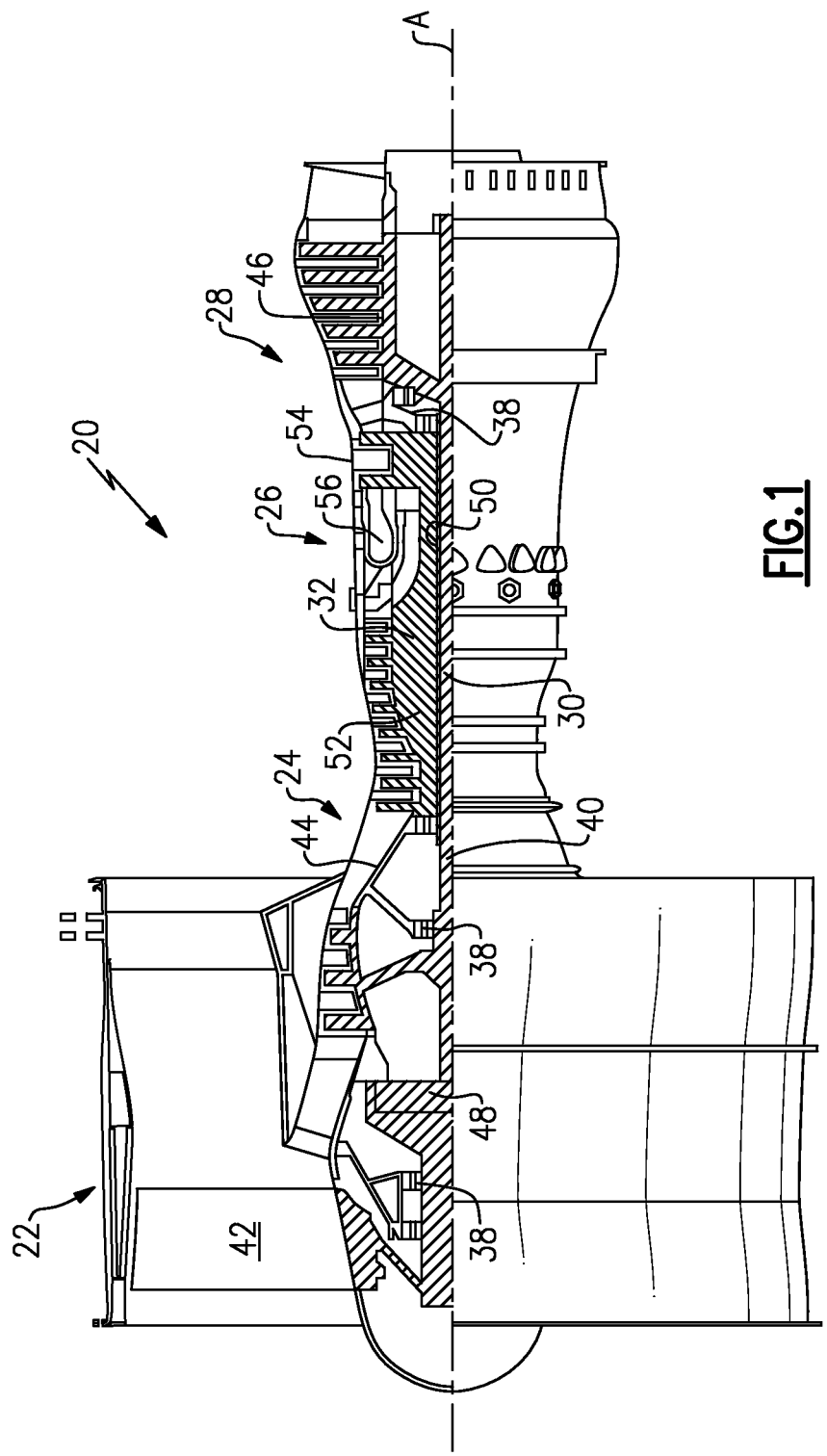
FIG. 1 shows a cross-section view of an example gas turbine engine.
Figure 2:
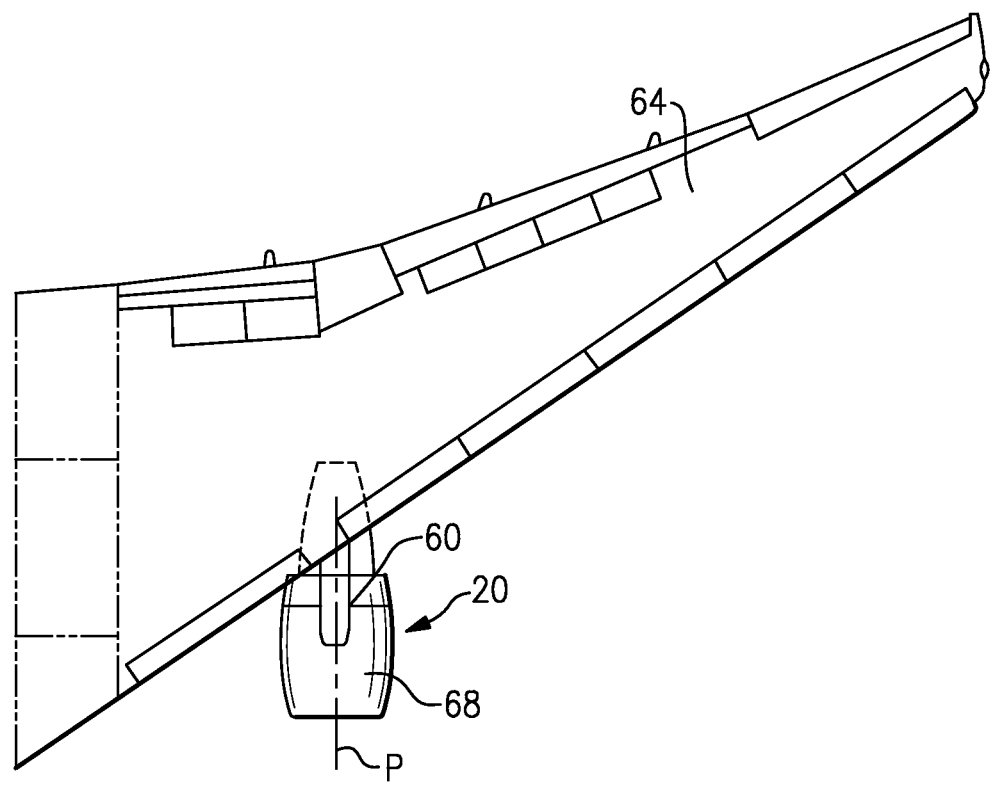
FIG. 2 shows a top view of the gas turbine engine of FIG. 1 mounted to an aircraft wing.
Figure 3:
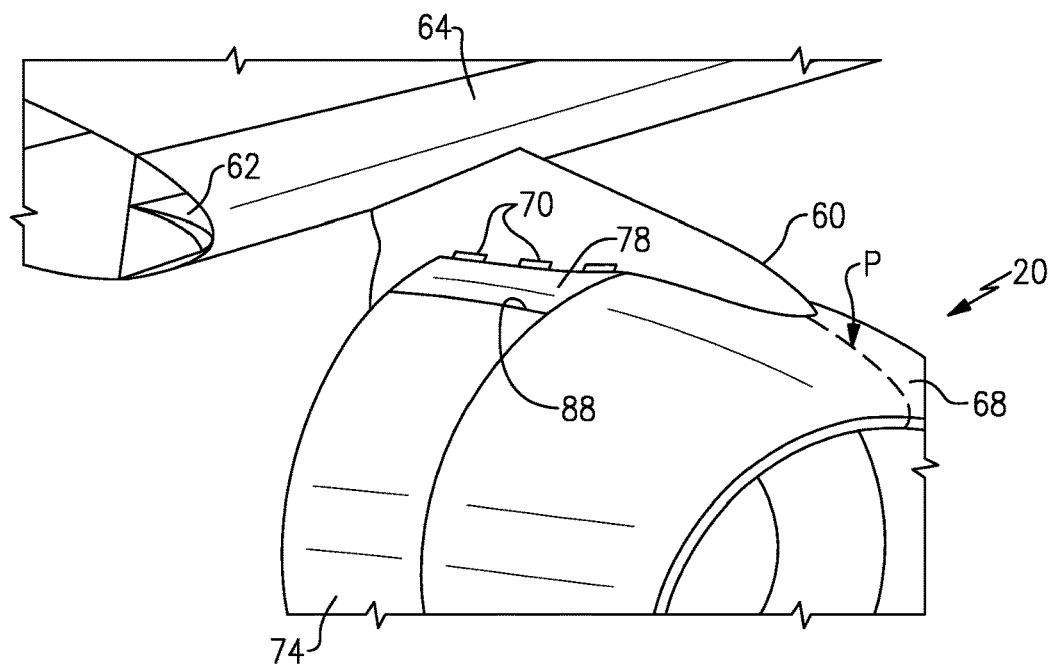
FIG. 3 shows a perspective view of a selected portions of FIG. 2 with wing slats and a thrust reverser in stowed positions.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(\text{Tram }° \text{R})/(518.7° \text{R})]^{0.5}$. The Temperature represents the ambient temperature in degrees Rankine. The Low Corrected Fan Tip Speed according to one non-limiting embodiment of the example engine 20 is less than about 1150 fps (351 m/s).

Referring to FIGS. 2 to 5, a pylon 60 may be used to connect the engine 20 to a wing 64 of an aircraft. The pylon 60, in this example, couples an outermost nacelle 68 of the engine 20 to the wing 64. The nacelle 68 is an example type of annular engine encasement. Thrust reverser mounts 70 are used to couple the pylon 60 to the outermost nacelle 68. The thrust reverser mounts 70 include hinges in some examples.

The example pylon 60 engages the nacelle 68 such that the pylon extends from a top circumferential apex P, which is generally the vertically highest position of the nacelle 68. The top circumferential apex P extends axially. The top circumferential apex P, in this example, corresponds to a twelve o'clock position when viewing the front or rear of the engine 20. As can be appreciated, the nacelle 68 also includes a bottom circumferential apex, which is the vertically lowest position, or a six o'clock position, of the nacelle 68. Vertical position, in this example, refers generally to an elevation when the aircraft is on the ground or in straight or level flight.

Figure 4:
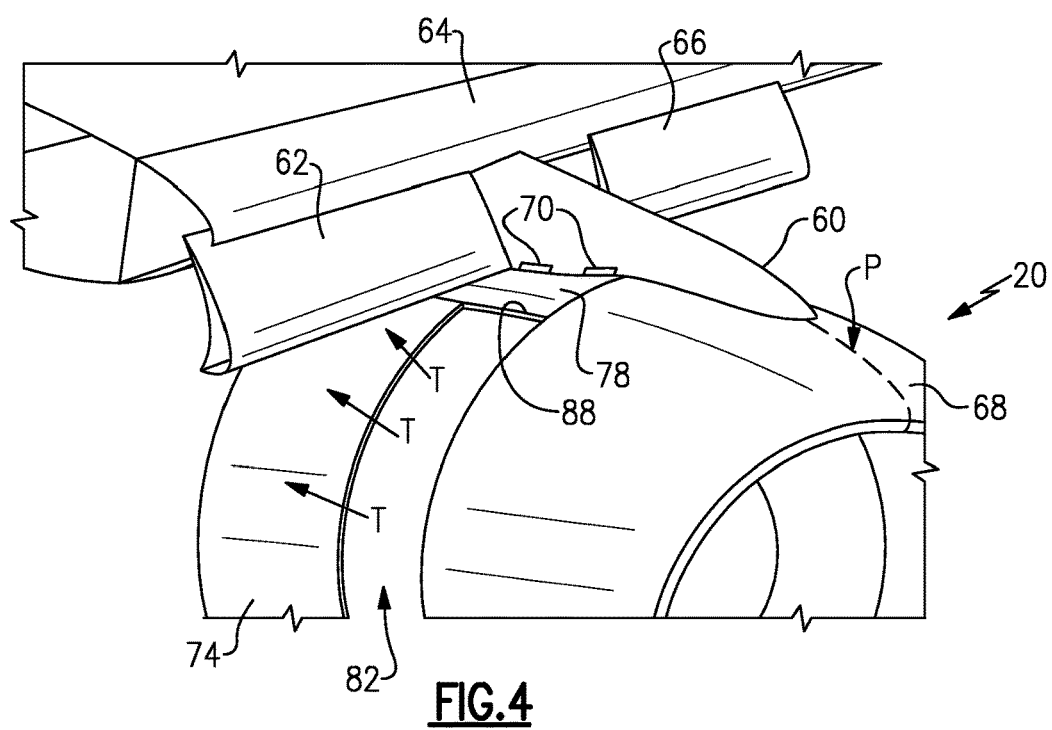
FIG. 4 shows the perspective view of the selected portions of the FIG. 2 with wing slats and a thrust reverser in deployed positions.

The wing 64 includes a first slat 62 and a second slat 66. The first slat 62 is positioned on an inboard side of the engine 20. The second slat 66 is positioned on an outboard side of the engine 20. The first and second slats 62 and 66 are movable between a stowed position (FIG. 3) and a deployed position (FIG. 4). The slats 62 and 66 are typically stowed during normal flight and deployed to slow the aircraft or during certain aircraft maneuvers.

The engine 20 includes a thrust reverser. In this example, the thrust reverser includes at least a first cowl 74 and a second cowl 78. The first cowl 74 is movable relative to the second cowl 78 between a stowed position (FIG. 3) and a deployed position (FIG. 4). The first cowl 74 is typically in the stowed position during normal flight and moved to the deployed position when reducing the speed of the aircraft is necessary. The first cowl 74 and second cowl 78 together form a transcowl. The first cowl 74 and the second cowl 78 are both arcuate cowls in this example.

The example first cowl 74 moves relative to the second cowl 78 by translating aftward along an axis that is aligned with the axis A. Translating the first cowl 74 reveals an opening 82 within the nacelle 68. The opening permits thrust T to move radially through the nacelle 68, and perhaps reverses some of thrust. Redirecting thrust T by moving thrust T through the opening 82 slows the engine 20 and thus the aircraft. Moving the first cowl 74 to the deployed position thus redirects thrust from the engine 20 slow the engine 20.

The second cowl 78 extends circumferentially from the attachment to the pylon 60 and, more specifically, the thrust reverser mounts 70. The second cowl 78 remains stationary relative to the first cowl 74 when the first cowl 74 moves between the stowed position and the deployed position.

The first cowl 74 interfaces with the second cowl 78 at an interface 88 or "split line." The second cowl 78 extends circumferentially in a first direction from the pylon 60 to the interface 88. The first cowl 74 extends circumferentially in the same direction from the interface 88 to the bottom circumferential apex of the nacelle 68.

When the first cowl 74 is in the stowed position, the first cowl 74 directly interfaces with the second cowl 78 at the interface 88. The first cowl 74 translates in the direction of the interface 88 when the first cowl 74 moves between the deployed position and the stowed position. The example interface 88 is an axially extending interface 88. The interface 88 may extend in other directions in other examples.

The interface 88, in this example, is circumferentially offset from the top circumferential apex P of the engine 20 by more than 18°. The offset is in a counterclockwise direction when facing the engine 20 from a position in from of the engine 20. The circumferential offset effectively moves the interface 88 to a vertically lower position than interfaces in the prior art.

During assembly of the engine 20 to the wing 64, the engine 20 can be moved vertically closer to the wing 64 without the first cowl 74 interfering with the first slat 62 when the first cowl 74 and the first slat 62 are both deployed. This is due to the interface 88, and thus the movable first cowl 74 moving vertically lower.

In one specific example, the interface 88 is circumferentially offset from the top circumferential apex from between 20 to 25 degrees. If another, more specific example, the interface 88 it is offset 32 degrees couterclockwise from the top circumferential apex P.

The example engine 20 includes a third cowl 92 that extends from the pylon 60 in a direction opposite the third cowl 74. The engine 20 also includes a fourth cowl 96 opposite the first cowl 74. The fourth cowl 96 is movable between a stowed position and a deployed position. An interface 98 between the third cowl 92 and the fourth cowl 96 maybe circumferentially offset from the top circumferential apex P in a clockwise direction an amount that is similar to the offset of the interface 88, such as 32 degrees. The first cowl 74, second cowl 78, third cowl 92, fourth cowl 96, and portions of the pylon 60 together form a complete annular member.

Contact between the first cowl 74 and the first slat 62 is often more likely than contact between the second slat 66 and the third cowl 92 due to the first slat 62 being axially forward the second slat 66. Thus, in some examples, only the interface 88 is moved further from the top circumferential apex P and to a lower vertical position. In some examples, the interfaces 88 and 98, or split planes, are both moved further from the top circumferential apex P to generally the same vertical position to provide symmetry to the nacelle 68.

Figure 5A:
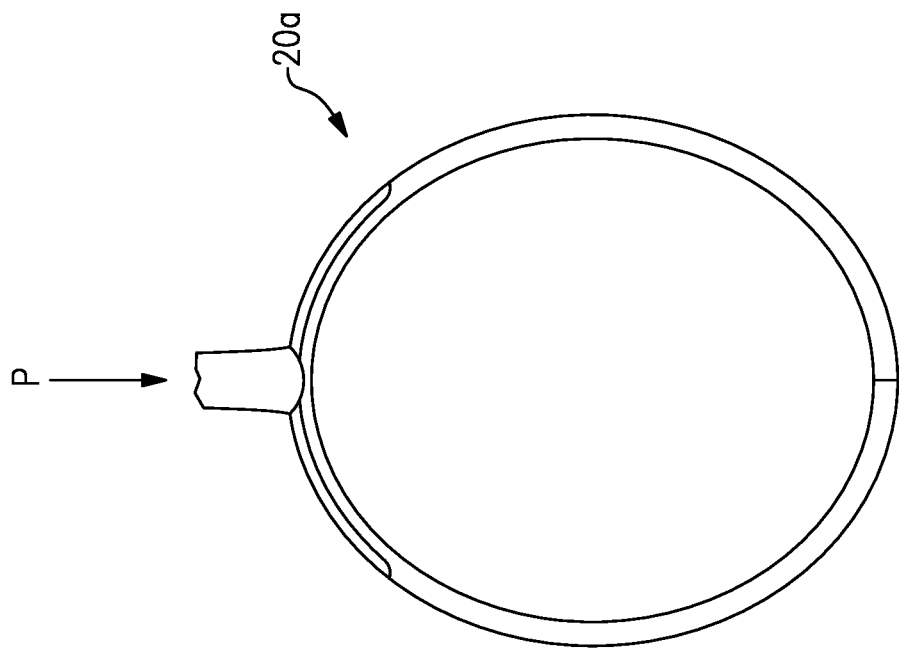
FIG. 5A shows a highly schematic front view of another example gas turbine engine.
Figure 5:
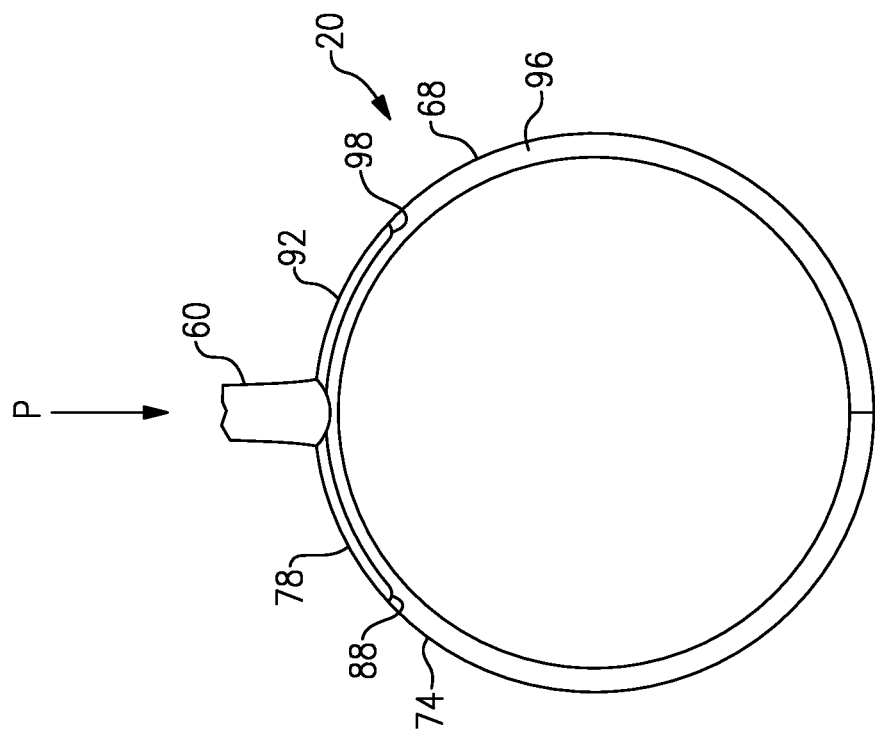
FIG. 5 shows a highly schematic front view of the gas turbine engine of FIG. 1.

When viewing the engine 20 from the front, the engine 20, as shown in FIG. 5, has a circular profile. In another example engine 20a (FIG. 5A), the profile may be noncircular.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A thrust reverser of a gas turbine engine configured to connect to an aircraft wing via a pylon via one or more thrust reverser mounts located substantially at or adjacent to a top circumferential apex of the engine, comprising:
    a first cowl moveable along an axis between a stowed position and a deployed position relative to a second cowl, the first cowl in the deployed position configured to permit thrust to be redirected from the engine,
    the first cowl forming a portion of a substantially annular encasement of the engine,
    the first cowl directly interfacing with the second cowl of the encasement at a cowl interface that is axially extending and is more than 18 degrees circumferentially offset in a first circumferential direction from the top circumferential apex when the first cowl is in the stowed position,
    the second cowl extending in the first circumferential direction from the top circumferential apex to the cowl interface, and the first cowl extending in the first circumferential direction from the cowl interface to a bottom circumferential apex, which circumferentially opposes the top circumferential apex; and
    a third cowl and a fourth cowl of the encasement, the fourth cowl movable between a stowed position and a deployed position relative to the third cowl, the third cowl directly interfacing with the fourth cowl at another position that is more than 18° circumferentially offset from the top circumferential apex.

2. The thrust reverser of claim 1, wherein the second cowl extends substantially from the top circumferential apex.

3. The thrust reverser of claim 2, wherein the thrust reverser mounts receive a pylon at the top circumferential apex of the encasement.

4. The thrust reverser of claim 1, wherein the first cowl and the second cowl are positioned on an inboard side of the engine, and the third cowl and the fourth cowl are positioned on an outboard side of the engine.

5. The thrust reverser of claim 1, wherein the second cowl and the fourth cowl extend from circumferentially opposite sides of the top circumferential apex.

6. The thrust reverser of claim 1, wherein the cowl interface is circumferentially offset from the top circumferential apex from 20 to 25 degrees.

7. The thrust reverser of claim 1, wherein the cowl interface is circumferentially offset 32 degrees from the top circumferential apex.

8. The thrust reverser of claim 1, wherein the first cowl moves between the deployed position and the stowed position along a path that causes the first cowl to avoid contact with a slat of the aircraft wing.

9. The thrust reverser of claim 1, wherein the axis is aligned with a rotational axis of the gas turbine engine, wherein the first cowl extends axially from a leading edge to terminate at a trailing edge such that no portion of the first cowl extends axially past the trailing edge, wherein the interface is an axially extending interface that extends linearly from the leading edge to the trailing edge.

10. The thrust reverser of claim 1, wherein the fourth cowl is movable between a stowed position and a deployed position relative to the third cowl, the third cowl directly interfacing with the fourth cowl at another position that is circumferentially offset from the top circumferential apex an amount that is less than the circumferential offset between the cowl interface between the first cowl and the second cowl.

11. The thrust reverser of claim 1, wherein the fourth cowl is movable between a stowed position and a deployed position relative to the third cowl, the fourth cowl interfacing with the first cowl at a bottom circumferential apex, the first cowl separate and distinct from the fourth cowl.

12. An engine configured to connect to an aircraft wing via a pylon located substantially at or adjacent to a top circumferential apex for the engine, comprising:
  a first cowl;
  a second cowl extending from a thrust reverser mount located substantially at the top circumferential apex in a first circumferential direction to a cowl interface, the first cowl extending in the first circumferential direction from the cowl interface to a bottom circumferential apex, the first cowl being translatable along an axis relative to the second cowl to selectively redirect thrust from the engine, wherein the second cowl interfaces with the first cowl at the cowl interface at a circumferential location that is more than 18° circumferentially offset from the top circumferential apex in the first circumferential direction, the cowl interface an axially extending cowl interface; and
  a third cowl extending from the thrust reverser mount located substantially at the top circumferential apex; and
  a fourth cowl translatable relative to the third cowl to selectively redirect thrust from the engine, wherein the fourth cowl is separate and distinct from the third cowl.

13. The engine of claim 12, wherein a twelve o'clock position is the top circumferential apex of the engine.

14. The engine of claim 12, wherein the thrust reverser mount is configured to receive the pylon such that the pylon extends from adjacent to the top circumferential apex.

15. The engine of claim 12, wherein the first cowl extends axially from a leading edge and terminates at a trailing edge, wherein the cowl interface is an axially extending interface that extends linearly from the leading edge to the trailing edge.

16. The engine of claim 12, wherein the axis is parallel to a rotational axis of the engine.

17. An engine configured to connect to an aircraft wing via a pylon located substantially at or adjacent to a top circumferential apex for the engine, comprising:
  a first cowl;
  a second cowl extending from a thrust reverser mount located substantially at the top circumferential apex in a first circumferential direction to a cowl interface, the first cowl extending in the first circumferential direction from the cowl interface to a bottom circumferential apex, the first cowl being translatable along an axis relative to the second cowl to selectively redirect thrust from the engine, wherein the second cowl interfaces with the first cowl at the cowl interface at a circumferential location that is more than 18° circumferentially offset from the top circumferential apex in the first circumferential direction, the cowl interface an axially extending cowl interface; and
  a third cowl and a fourth cowl of the encasement, the fourth cowl movable between a stowed position and a deployed position relative to the third cowl, the third cowl directly interfacing with the fourth cowl at another position that is circumferentially offset from the top circumferential apex an amount that is different than the circumferential offset between the cowl interface between the first cowl and the second cowl.

* * * * *